(12) United States Patent
Sinha et al.

(10) Patent No.: US 12,314,700 B2
(45) Date of Patent: *May 27, 2025

(54) CLUSTER PARTITION HANDLING DURING UPGRADE OF A HIGHLY AVAILABLE APPLICATION HOSTED IN A DATA CENTER

(71) Applicant: VMware LLC, Palo Alto, CA (US)

(72) Inventors: Sandeep Sinha, Bangalore (IN); Aniket Avinash Sakhardande, Sunnyvale, CA (US); Rahul Kumar Singh, Bangalore (IN); Chandrika Mutalik, Bangalore (IN); Akash Kodenkiri, Bangalore (IN); Vasantha Kumari Tammana, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 17/979,808

(22) Filed: Nov. 3, 2022

(65) Prior Publication Data

US 2024/0020108 A1    Jan. 18, 2024

(30) Foreign Application Priority Data

Jul. 18, 2022   (IN) .............................. 202241040975

(51) Int. Cl.
*G06F 8/65* (2018.01)
*G06F 8/71* (2018.01)
*G06F 11/20* (2006.01)

(52) U.S. Cl.
CPC .................. *G06F 8/65* (2013.01); *G06F 8/71* (2013.01); *G06F 11/2023* (2013.01)

(58) Field of Classification Search
CPC ........... G06F 11/2023; G06F 8/71; G06F 8/65
See application file for complete search history.

(56) References Cited

U.S. PATENT DOCUMENTS

| | | | |
|---|---|---|---|
| 7,703,102 B1 * | 4/2010 | Eppstein ............... | G06F 9/5011 718/100 |
| 8,271,441 B1 * | 9/2012 | Natanzon ............ | G06F 11/2058 707/634 |

(Continued)

*Primary Examiner* — Wei Y Zhen
*Assistant Examiner* — Brahim Bourzik
(74) *Attorney, Agent, or Firm* — Kim & Stewart LLP

(57) ABSTRACT

An example method of upgrading an application in a software-defined data center (SDDC) includes: deploying, by lifecycle management software executing in the SDDC, a second appliance, a first appliance executing services of the application at a first version, the second appliance having services of the application at a second version, the services in the first appliance being active and the services in the second appliance being inactive; setting, by the lifecycle management software, the first and second appliances as a preemptive pair, where the first appliance is protected and the second appliance is unprotected by fault domain management (FDM) software executing in the SDDC; performing, by the lifecycle management software, a switchover to stop the services of the first appliance and start the services of the second appliance; and setting, by the lifecycle management software, the first appliance as unprotected and the second appliance as protected by the FDM software.

17 Claims, 10 Drawing Sheets

(56) References Cited

U.S. PATENT DOCUMENTS

| | | | |
|---|---|---|---|
| 2012/0311706 A1* | 12/2012 | Newman | G06Q 20/401 |
| | | | 726/22 |
| 2013/0046731 A1* | 2/2013 | Ghosh | G06F 11/2097 |
| | | | 707/622 |
| 2014/0059392 A1* | 2/2014 | Ren | G06F 11/1484 |
| | | | 714/47.1 |
| 2014/0201725 A1* | 7/2014 | Tian | G06F 8/65 |
| | | | 717/169 |
| 2017/0090897 A1* | 3/2017 | Veereshwara | G06F 8/656 |
| 2021/0117859 A1* | 4/2021 | Rogers | G06F 8/65 |
| 2023/0030000 A1 | 2/2023 | Sinha et al. | |
| 2024/0004687 A1* | 1/2024 | Babarjung | G06F 9/45558 |

* cited by examiner

CLUSTER PARTITION HANDLING DURING UPGRADE OF A HIGHLY AVAILABLE APPLICATION HOSTED IN A DATA CENTER

RELATED APPLICATIONS

Benefit is claimed under 35 U.S.C. 119(a)-(d) to Foreign Application Serial No. 202241040975 filed in India entitled "CLUSTER PARTITION HANDLING DURING UPGRADE OF A HIGHLY AVAILABLE APPLICATION HOSTED IN A DATA CENTER", on Jul. 18, 2022, by VMware, Inc., which is herein incorporated in its entirety by reference for all purposes.

BACKGROUND

In a software-defined data center (SDDC), virtual infrastructure, which includes virtual compute, storage, and networking resources, is provisioned from hardware infrastructure that includes a plurality of host computers, storage devices, and networking devices. The provisioning of the virtual infrastructure is carried out by management software that communicates with virtualization software (e.g., hypervisor) installed in the host computers.

As described in U.S. patent application Ser. No. 17/464,733, filed on Sep. 2, 2021, the entire contents of which are incorporated by reference herein, the desired state of the SDDC, which specifies the configuration of the SDDC (e.g., the number of clusters, the hosts that each cluster would manage, and whether or not certain features, such as distributed resource scheduling, high availability, and workload control plane, are enabled), may be defined in a declarative document, and the SDDC is deployed or upgraded according to the desired state defined in the declarative document.

Today's applications executing in an SDDC require always-on access. This mandates upgrade downtime for applications to be reduced from hours to minutes, particularly when such applications require frequent upgrades ("reduced downtime upgrade"). In addition, it is desirable to provide a way to revert the application to a stable state should a reduced downtime upgrade fail. It is further desirable to manage high availability and distributed resource scheduling during a reduced downtime upgrade and provide necessary error handling (e.g., in cases where the cluster has network partitions).

SUMMARY

In an embodiment, a method of upgrading an application in a software-defined data center (SDDC) includes: deploying, by lifecycle management software executing in the SDDC, a second appliance, a first appliance executing services of the application at a first version, the second appliance having services of the application at a second version, the services in the first appliance being active and the services in the second appliance being inactive; setting, by the lifecycle management software, the first and second appliances as a preemptive pair, where the first appliance is protected and the second appliance is unprotected by fault domain management (FDM) software executing in the SDDC; performing, by the lifecycle management software, a switchover to stop the services of the first appliance and start the services of the second appliance; and setting, by the lifecycle management software, the first appliance as unprotected and the second appliance as protected by the FDM software.

Further embodiments include a non-transitory computer-readable storage medium comprising instructions that cause a computer system to carry out the above method, as well as a computer system configured to carry out the above method.

DETAILED DESCRIPTION

One or more embodiments employ a cloud control plane for managing the configuration of SDDCs, which may be of different types and which may be deployed across different geographical regions, according to a desired state of the SDDC defined in a declarative document referred to herein as a desired state document. The cloud control plane is responsible for realizing the desired state and specifying configuration operations to be carried out in the SDDCs according to the desired state. Thereafter, configuration agents running locally in the SDDCs establish cloud inbound connections with the cloud control plane to acquire the desired state and the configuration operations to be carried out, and delegate the execution of these configuration operations to services running in a local SDDC control plane.

Figure 1:
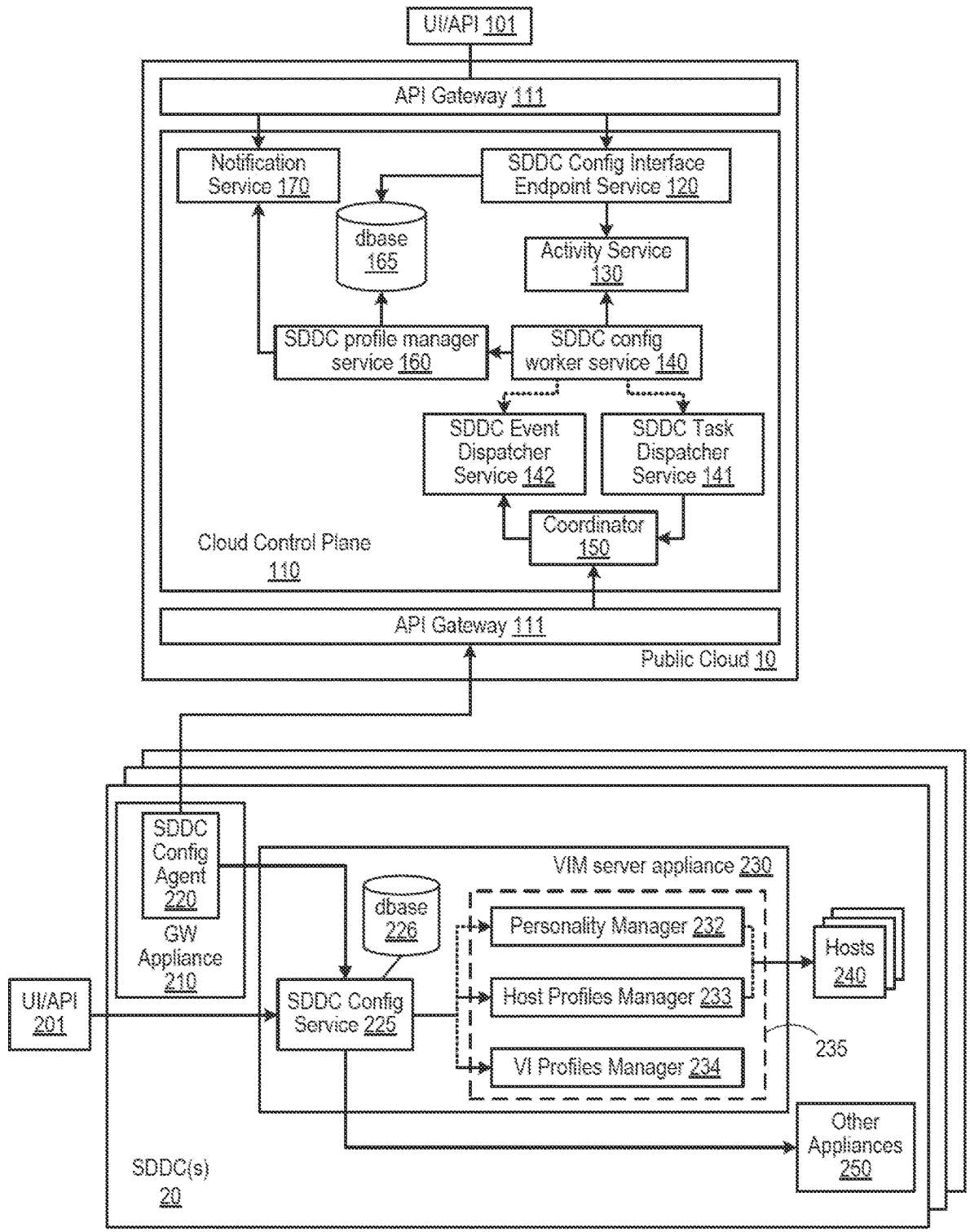
FIG. 1 depicts a cloud control plane implemented in a public cloud, and a plurality of SDDCs that are managed through the cloud control plane, according to embodiments.

FIG. 1 depicts a cloud control plane 110 implemented in a public cloud 10, and a plurality of SDDCs 20 that are managed through cloud control plane 110. In the embodiment illustrated herein, cloud control plane 110 is accessible by multiple tenants through UI/API 101 and each of the different tenants manage a group of SDDCs through cloud control plane 110 according to a desired state of the SDDCs that the tenant defines in a desired state document. In the following description, a group of SDDCs of one particular tenant is depicted as SDDCs 20, and to simplify the description, the operation of cloud control plane 110 will be described with respect to management of SDDCs 20. However, it should be understood that the SDDCs of other tenants may have the same appliances, software products, and services running therein as SDDCs 20, and are managed through cloud control plane 110 in the same manner as described below for SDDCs 20.

A user interface (UI) or an application programming interface (API) that interacts with cloud control plane 110 is depicted in FIG. 1 as UI/API 101. Through UI/API 101, an administrator of SDDCs 20 can issue commands to: (1) get the desired state or the running state of any of SDDCs 20; (2) create the desired state of SDDCs 20, e.g., by specifying a location of the desired state document or specifying the running state of one of SDDCs 20 to be used as the desired state of all SDDCs 20; (3) perform a compliance check of SDDCs against the desired state; and (4) apply the desired state to SDDCs 20.

Cloud control plane 110 represents a group of services running in virtual infrastructure of public cloud 10 that interact with each other to provide a control plane through which the administrator of SDDCs 20 can manage the desired state of SDDCs 20 by issuing commands through UI/API 101. API gateway 111 is also a service running in the virtual infrastructure of public cloud 10 and this service is responsible for routing cloud inbound connections to the proper service in cloud control plane 110, e.g., SDDC configuration interface endpoint service 120, notification service 170, or coordinator 150.

SDDC configuration interface endpoint service 120 is responsible for accepting commands made through UI/API 101 and returning the result to UI/API 101. An operation requested in the commands can be either synchronous or asynchronous. Asynchronous operations are stored in activity service 130, which keeps track of the progress of the operation, and an activity ID, which can be used to poll for the result of the operation, is returned to UI/API 101. If the operation targets multiple SDDCs 20, SDDC configuration interface endpoint service 120 creates an activity which has children activities. SDDC configuration worker service 140 processes these children activities independently and respectively for multiple SDDCs 20, and activity service 130 tracks these children activities according to results returned by SDDC configuration worker service 140.

SDDC configuration worker service 140 polls activity service 130 for new operations and processes them by passing the tasks to be executed to SDDC task dispatcher service 141. SDDC configuration worker service 140 then polls SDDC task dispatcher service 141 for results and notifies activity service 130 of the results. SDDC configuration worker service 140 also polls SDDC event dispatcher service 142 for events posted to SDDC event dispatcher service 142 and handles these events based on the event type. Examples of events posted to SDDC event dispatcher service 142 include a change event, where "a local change has been made to the desired state of an SDDC" and a drift event, where "the running state of SDDC is out of compliance with its desired state."

SDDC task dispatcher service 141 routes each task passed thereto by SDDC configuration worker service 140, to coordinator 150 and tracks the progress of the task by polling coordinator 150. Coordinator 150 accepts cloud inbound connections, which are routed through API gateway 111, from SDDC configuration agents 220. SDDC configuration agents 220 are responsible for orchestrating the execution of the tasks routed to coordinator 150 in their respective SDDCs 20. Upon completion of the tasks, SDDC configuration agents 220 return results to coordinator 150 through the cloud inbound connections. SDDC configuration agents 220 also notify coordinator 150 of various events through the cloud inbound connections, and coordinator 150 in turn posts these events to SDDC event dispatcher service 142 for handling by SDDC configuration worker service 140.

SDDC profile manager service 160 is responsible for storing the desired state documents in database 165 and, for each of SDDCs 20, tracks the history of the desired state document associated therewith and any drift in its running state from the desired state specified in its desired state document. Accordingly, when SDDC configuration agent 220 of an SDDC notifies coordinator 150 of a change event, and coordinator 150 posts the change event to SDDC event dispatcher service 142, SDDC configuration worker service 140 calls SDDC profile manager service 160 to record the change to the desired state of the SDDC in database 165. Similarly, when SDDC configuration agent 220 of an SDDC notifies coordinator 150 of a drift event, and coordinator 150 posts the drift event to SDDC event dispatcher service 142, SDDC configuration worker service 140 calls SDDC profile manager service 160 to record the drift in the running state of the SDDC from the desired state in database 165. Thereafter, SDDC profile manager service 160 posts notifications about any changes made to database 165 to notification service 170, and the administrator can get such notifications through UI/API 101.

An operation requested in the commands made through UI/API 101 may be synchronous, instead of asynchronous. An operation is synchronous if there is a specific time window within which the operation must be completed. Examples of a synchronous operation include an operation to get the desired state of an SDDC or an operation to get SDDCs that are associated with a particular desired state. In the embodiments, to enable such operations to be completed within the specific time window, SDDC configuration interface endpoint service 120 has direct access to database 165.

As described above, a plurality of SDDCs 20, which may be of different types and which may be deployed across different geographical regions, is managed through cloud control plane 110. In one example, one of SDDCs 20 is deployed in a private data center of the customer and another one of SDDCs 20 is deployed in a public cloud, and all of SDDCs are located in different geographical regions so that they would not be subject to the same natural disasters, such as hurricanes, fires, and earthquakes.

Any of the services of described above may be a microservice that is implemented as a container image executed on the virtual infrastructure of public cloud 10 (and/or private cloud). In one embodiment, each of the services described above is implemented as one or more container images running within a Kubernetes® pod.

In each SDDC 20, regardless of its type and location, a gateway appliance 210 and virtual infrastructure management (VIM) appliance 230 are provisioned from the virtual resources of SDDC 20. Gateway appliance 210 is able to establish connections with cloud control plane 110 and a local control plane of SDDC 20. In particular, SDDC configuration agent 220 running in gateway appliance 210 communicates with coordinator 150 to retrieve the tasks (e.g., various SDDC configuration actions, such as check compliance against desired state and apply desired state) that were routed to coordinator 150 for execution in SDDC 20 and delegates the tasks to SDDC configuration service 225 running in VIM server appliance 230. After the execution of these tasks have completed, SDDC configuration agent 220 sends back the execution result to coordinator 150.

SDDC configuration service 225 is responsible for passing on the tasks delegated by SDDC configuration agent 220 to the local control plane of SDDC 20, which includes: (1) a personality manager 232, which is responsible for applying the desired image of the virtualization software to a cluster of hosts 240 according to the desired state; (2) host profiles manager 233, which is responsible for applying the desired configurations of the cluster of hosts 240 according to the desired state; (3) virtual infrastructure (VI) profiles manager 234, which is responsible for applying the desired configuration of the virtual infrastructure managed by VIM server appliance 230 (e.g., the number of clusters, the hosts that each cluster would manage, etc.) and other appliances 250 (e.g., appliance that hosts the network virtualization software product), and the desired configuration of various features provided by software products running in VIM server appliance 230 (e.g., distributed resource scheduling, high availability, and workload control plane), according to the desired state. In one embodiment, SDDC configuration service 225 is implemented as one or more container images running within a Kubernetes pod. In embodiments, personality manager 232, host profiles manager 233, and VI profiles manager 234 comprise a lifecycle manager (LCM) 235.

The desired state is defined in a desired state document stored in database 226 and may be specified in the tasks retrieved from coordinator 150 and delegated to SDDC configuration service 225 or specified by the administrator of SDDCs 20 through UI/API 201. If the desired state is specified by the administrator of SDDCs 20 through UI/API 201, SDDC configuration agent 220 notifies coordinator 150 of this change event, i.e., that "a local change has been made to the desired state of an SDDC."

SDDC configuration service 225 performs a compliance check of the running state of SDDC 20 against the desired state, both periodically and in response to a "compliance check" task retrieved from coordinator 150 and delegated to SDDC configuration service 225. If a drift of the running state of SDDC 20 from the desired state is detected as a result of this compliance check, SDDC configuration agent 220 notifies coordinator 150 of this drift event, i.e., that "the running state of SDDC is out of compliance with its desired state."

Figure 2:
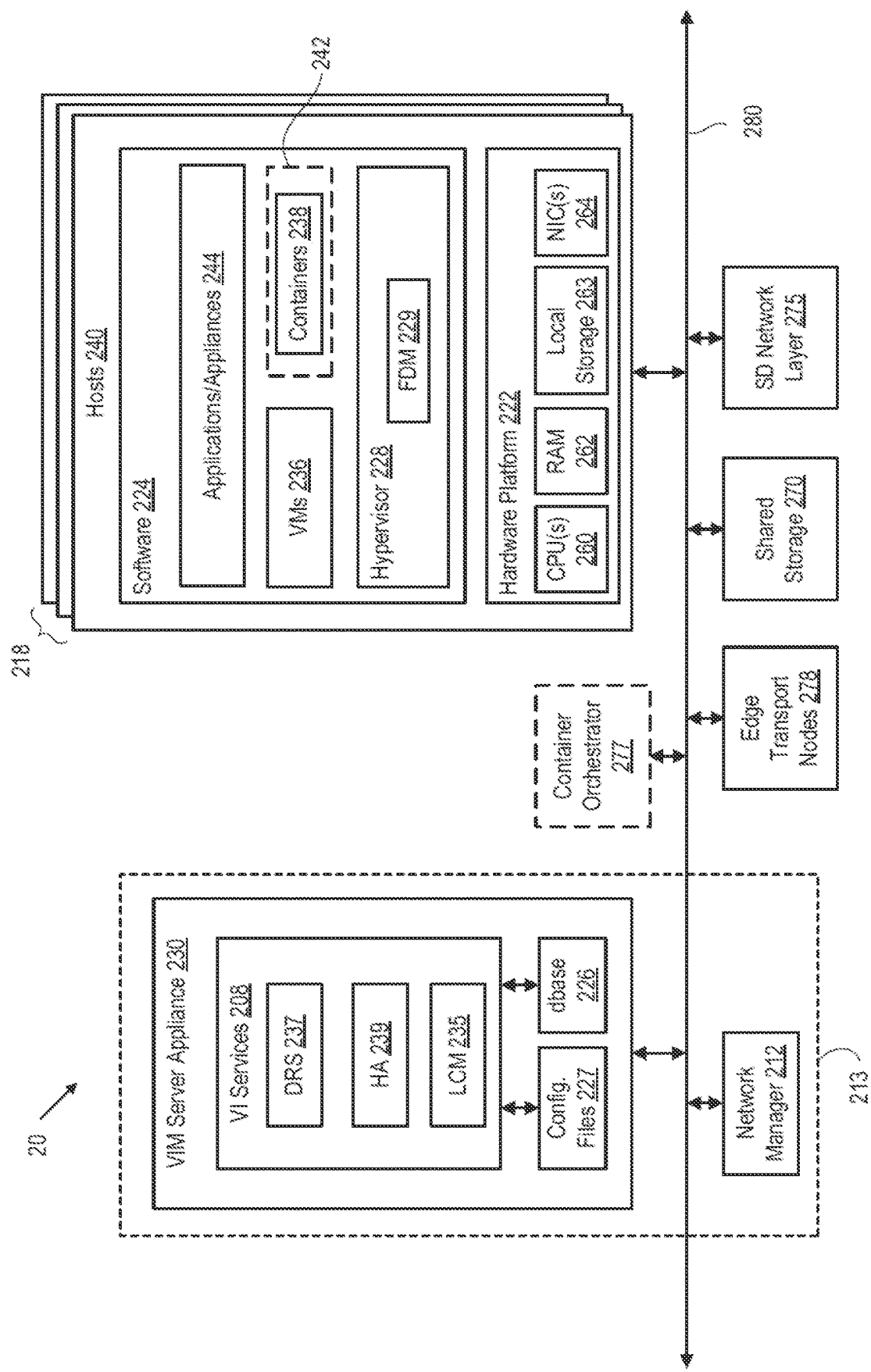
FIG. 2 is a block diagram of an SDDC in which embodiments described herein may be implemented.

FIG. 2 is a block diagram of an SDDC 20 in which embodiments described herein may be implemented. SDDC 20 includes a cluster of hosts 240 ("host cluster 218") that may be constructed on server-grade hardware platforms such as an x86 architecture platforms. For purposes of clarity, only one host cluster 218 is shown. However, SDDC 20 can include many of such host clusters 218. As shown, a hardware platform 222 of each host 240 includes conventional components of a computing device, such as one or more central processing units (CPUs) 260, system memory (e.g., random access memory (RAM) 262), one or more network interface controllers (NICs) 264, and optionally local storage 263. CPUs 260 are configured to execute instructions, for example, executable instructions that perform one or more operations described herein, which may be stored in RAM 262. NICs 264 enable host 240 to communicate with other devices through a physical network 280.

Physical network 280 enables communication between hosts 240 and between other components and hosts 240 (other components discussed further herein).

In the embodiment illustrated in FIG. 2, hosts 240 access shared storage 270 by using NICs 264 to connect to network 280. In another embodiment (not shown) each host 240 contains a host bus adapter (HBA) through which input/output operations (IOs) are sent to shared storage 270 over a separate network (e.g., a fibre channel (FC) network). Shared storage 270 include one or more storage arrays, such as a storage area network (SAN), network attached storage (NAS), or the like. Shared storage 270 may comprise magnetic disks, solid-state disks, flash memory, and the like as well as combinations thereof. In some embodiments, hosts 240 include local storage 263 (e.g., hard disk drives, solid-state drives, etc.). Local storage 263 in each host 240 can be aggregated and provisioned as part of a virtual SAN (vSAN), which is another form of shared storage 270.

Software 224 of each host 240 provides a virtualization layer, referred to herein as a hypervisor 228, which directly executes on hardware platform 222. In an embodiment, there is no intervening software, such as a host operating system (OS), between hypervisor 228 and hardware platform 222. Thus, hypervisor 228 is a Type-1 hypervisor (also known as a "bare-metal" hypervisor). As a result, the virtualization layer in host cluster 218 (collectively hypervisors 228) is a bare-metal virtualization layer executing directly on host hardware platforms. Hypervisor 228 abstracts processor, memory, storage, and network resources of hardware platform 222 to provide a virtual machine execution space within which multiple virtual machines (VM) 236 may be concurrently instantiated and executed. Applications and/or appliances 244 execute in VMs 236 and/or containers 238 (discussed below).

Host cluster 218 is configured with a software-defined (SD) network layer 275. SD network layer 275 includes logical network services executing on virtualized infrastructure in host cluster 218. Software defined networking (SDN) implemented by SD network layer 275 may comprise a control plane comprising one or more controllers and a data plane that comprises a set of overlay networks and one or more underlay (i.e., physical) networks. The one or more controllers may reside on virtual machines and deploy logical overlay networks on which virtual machines or other virtualized endpoints may reside by instantiating and configuring virtual switches, virtual distributed routers, tunnel endpoints, and other components implemented in software and in conjunction with hypervisors running on each host. In embodiments, SDDC 20 includes edge transport nodes 278 that provide an interface of host cluster 218 to a wide area network (WAN) (e.g., a corporate network, the public Internet, etc.).

VIM server appliance 230 is a physical or virtual server that manages host cluster 218 and the virtualization layer therein. VIM server appliance 230 uses agent(s) (not shown) in hypervisor 228 so that host 240 can be managed by VIM server appliance 230. VIM server appliance 230 logically groups hosts 240 into host cluster 218 to provide cluster-level functions to hosts 240, such as VM migration between hosts 240 (e.g., for load balancing), distributed power management, and high-availability. The number of hosts 240 in host cluster 218 may be one or many. VIM server appliance 230 can manage more than one host cluster 218.

In an embodiment, SDDC 20 further includes a network manager 212. Network manager 212 is a physical or virtual server that orchestrates SD network layer 275. In an embodiment, network manager 212 comprises one or more virtual servers deployed as VMs which may be placed on hosts 240 or elsewhere in SDDC 20, and in alternative embodiments, in a remote location such as a public cloud. Network manager 212 operates in conjunction with additional agents in hypervisor 228 to manage host 240.

VIM server appliance 230 and network manager 212 comprise a virtual infrastructure (VI) control plane 213 of SDDC 20. VIM server appliance 230 can include various VI services 208. VI services 208 include various virtualization management services, such as a distributed resource scheduler (DRS) 237, high-availability (HA) service 239, single sign-on (SSO) service, virtualization management daemon, and the like. DRS 237 is configured to aggregate the resources of host cluster 218 to provide resource pools and enforce resource allocation policies. DRS 237 also provides resource management in the form of load balancing, power management, VM placement, and the like. HA service 239 is configured to pool VMs and hosts into a monitored cluster and, in the event of a failure, restart VMs on alternate hosts in the cluster. HA service 239 cooperates with fault domain manager (FDM) 229 in each host 240. A single host is elected as a master, which communicates with the HA service 239 and monitors the state of protected VMs on subordinate hosts. HA service 239 uses admission control to ensure enough resources are reserved in the cluster for VM recovery when a host fails. VI services 208 can further include LCM 235. VI services 208 store and/or use state in database 226 and configuration (config) files 227.

SDDC 20 can include a container orchestrator 277. Container orchestrator 277 implements an orchestration control plane, such as Kubernetes®, to deploy and manage applications or services thereof on host cluster 218 using containers 238. Hypervisor 228 may be configured to support containers 238 executing directly thereon. Alternatively or in addition, containers 238 may be deployed in VMs 236 or in specialized VMs referred to as "pod VMs 242." A pod VM 242 is a VM that includes a kernel and container engine that supports execution of containers, as well as an agent (referred to as a pod VM agent) that cooperates with a controller executing in hypervisor 228 (referred to as a pod VM controller). Container orchestrator 277 can include one or more master servers configured to command and configure pod VM controllers in host cluster 218. Master server(s) can be physical computers attached to network 280 or VMs 236 in host cluster 218.

Figure 3:
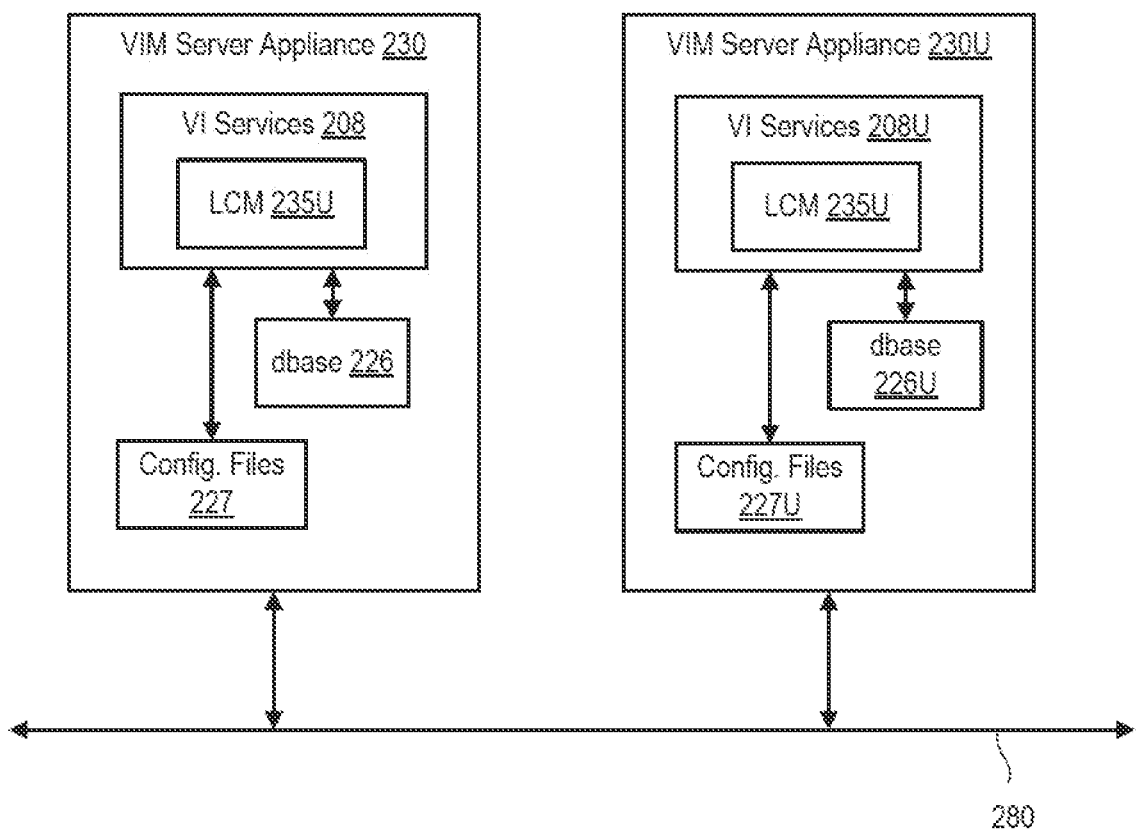
FIG. 3 is a block diagram depicting a VIM server appliance during an upgrade operation according to embodiments.

FIG. 3 is a block diagram depicting VIM server appliance 230 during an upgrade operation according to embodiments. During an upgrade, VIM server appliance 230 is active and running and an upgraded VM server appliance 230U is running but inactive. That is, VI services 208 are active and executing while VI services 208U are inactive. VI services 208U are upgraded with respect to VI services 208. In addition, a database 226U in VIM server appliance 230U is an empty database set up to receive data replication from database 226. In embodiments, LCM 235 in VIM server appliance 230 is upgraded in-place such that each of VIM server appliance 230 and VIM server appliance 230U executes an upgraded LCM 235U. LCM 235U in each of VIM service appliances 230 and 230U are collectively referred to as LCM software. In various embodiments, VIM server appliance 230 is referred to as a "source VIM service appliance" and VIM server appliance 230U is referred to as a "target VIM server appliance."

The LCM software is configured to perform the upgrade process, which includes the following phases: (1) the expand phase; (2) the switchover phase; and (3) the contract phase. During the expand phase, LCM 235U expands database 226 to support both the deprecated and upgraded schemas, where the schema of database 226 is referred to as the "deprecated scheme" and the schema of database 226U is referred to as the "upgraded schema." VI services 208 continue to be active and execute while database 226 is expanded and can continue to interface with database 226, since the deprecated schema is still supported. LCM 235U can also expand one or more configuration files 227 if supported. After database 226 is expanded, LCM 235U replicates database 226 to database 226U and configuration files 227 to configuration files 227U. During the switchover phase, LCM 235 deactivates VI services 208 and activates VI services 208U. During the contract phase, LCM 235U contracts database 226U to remove deprecated portions of the schema (e.g., after contraction, database 226 supports only the upgraded schema). VI services 208U are active and execute during the contract phase. LCM 235U can also contract any configuration files 227U that were expanded in the expand phase.

Figure 4:
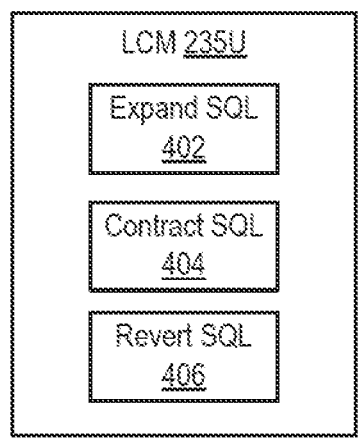
FIG. 4 is a block diagram depicting lifecycle management software according to an embodiment.

FIG. 4 is a block diagram depicting LCM 235U according to an embodiment. LCM 235U include expand structured query language (SQL) code 402, contract SQL code 404, and revert SQL code 406. LCM 235U executes expand SQL code 402 to perform the expand phase of database 226. LCM 235U executes contract SQL code 404 to perform the contract phase of database 226U. Revert SQL 406 includes reciprocal SQL code of expand SQL code. LCM 235U can execute revert SQL 406 to perform a revert/rollback of the expansion of database 226 in case of a failure for example.

Figure 5:
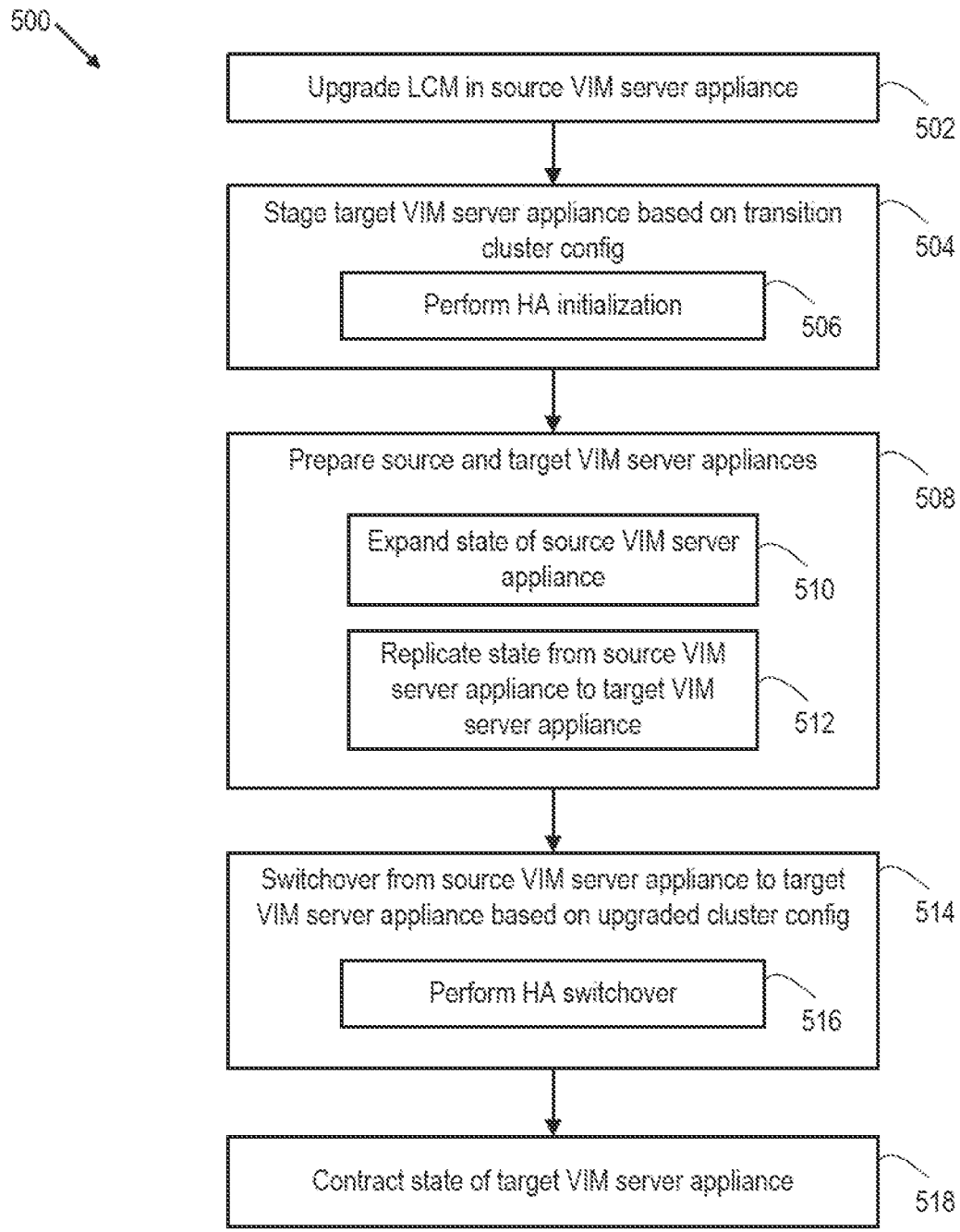
FIG. 5 is a flow diagram depicting a method of upgrading an application according to an embodiment.

FIG. 5 is a flow diagram depicting a method 500 of upgrading an application according to an embodiment. In embodiments, the application is a VIM server appliance. The VIM server appliance is highly available and protected by an HA service. Method 500 can be performed by LCM software executing in a VIM server appliance 230 (source) and upgraded VM server appliance 230U (target). Prior to the upgrade, VIM server appliance 230 is deployed in a cluster of hosts 240 (e.g., a management cluster) and protected by HA service 239 in cooperation with FDM 229 in each host 240. After the upgrade is complete, VIM server appliance 230U is deployed, active, and protected by HA. The process of handling HA during the upgrade is discussed below.

Method 500 begins at step 502, where the LCM software upgrades itself from a current version to a new version. For example, LCM 235 can perform an in-place upgrade while VI services 208 in VIM server appliance 230 continue to execute. Upgrading LCM 235 to the new version allows the new upgrade logic to be present before the start of the application upgrade. After step 502, VIM server appliance 230 executes upgraded LCM 235U.

At step 504, the LCM software stages the target VIM server appliance based on a transition cluster configuration (cluster config). In the transition cluster configuration, the source VIM server appliance (VIM server appliance 230) is active and running, while the target VIM server appliance (e.g., VIM server appliance 230U) is running, but inactive. In this staging phase, the LCM software deploys an upgraded VIM server appliance as the target. For example, LCM 235U in VIM server appliance 230 deploys upgraded VM server appliance 230U. LCM 235U deploys VIM server appliance 230U such that VIM server appliance 230U is running (e.g., the virtual computing instance is booted and the operating system executing), but VI services 208U other than LCM 235U are inactive and not executing. VI services 208 in VIM server appliance 230 continue to be active and executing. During step 504, the LCM software performs HA initialization (step 506) to account for the presence of both the source VIM server appliance and the target VIM server appliance. Step 504 is discussed further below with respect to FIG. 6.

Figure 6:
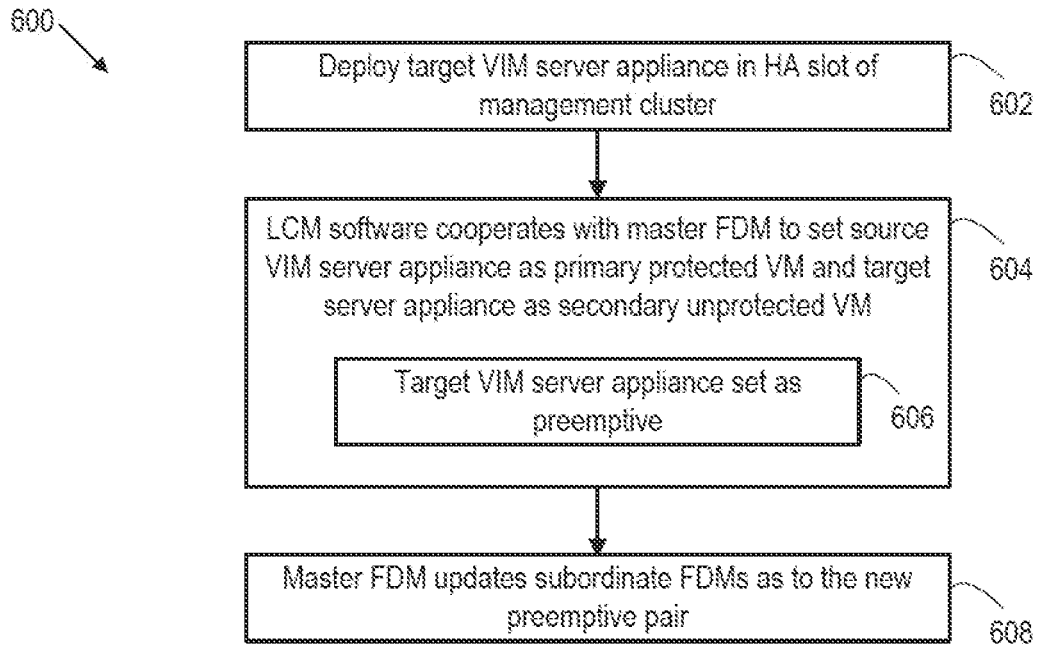
FIG. 6 is a flow diagram depicting a method of initializing high availability during a reduced downtime upgrade of an HA-protected application according to embodiments.

FIG. 6 is a flow diagram depicting a method 600 of initializing high availability during a reduced downtime upgrade of an HA-protected application according to embodiments. Method 600 can be performed in step 506 of method 500 discussed above to perform HA initialization. Method 600 begins at step 602, where LCM software deploys target VIM server appliance in an HA slot of the management cluster. A management cluster can have various management appliances, including the source VIM server appliance. The HA service reserves "slots" on hosts in the management cluster in which VMs can be restarted in case of various failures. An HA slot is a reservation of resources in the management cluster that would allow for a restart of a management VM in case of failure. The target VIM server appliance is deployed in an HA slot for the management cluster and thus does not consume any additional resources that have not already been allocated prior to the upgrade operation.

At step 604, the LCM software cooperates with a master FDM to set the source VIM server appliance as a primary protected VM and the target VIM server appliance as a secondary unprotected VM. In the management cluster, one FDM 229 in a host is set as the master FDM and the other FDMs 229 are set as secondary FDMs by an election among FDMs 229. The source VIM server appliance is linked with the target VIM server appliance and remains a protected VM (i.e., capable of being restarted on another host in case of failure). The target VIM server appliance is set as unprotected. As such, if the host having the target VIM server appliance failures, FDMs 229 would not restart the target VIM server appliance. At step 606, the target VIM server appliance is set as preemptive. A preemptive VM can be suspended in case resources are needed to restart a protected VM. At step 608, the master FDM updates subordinate FDMs as to the new preemptive pair of the source and target VIM server appliances.

Returning to FIG. 5, at step 508, the LCM software prepares the source and target VIM server appliances. During this phase, at step 510, the LCM software expands the state of the current VIM server appliance. For example, LCM 235U expands the state of VIM server appliance 230. The state expansion operation includes expanding database state (e.g., expanding the state of database 226 in VIM server appliance 230). Expansion includes making changes to the database schema to add support for the upgraded VI services 208U while maintaining support and compatibility with VI services 208. LCM 235U can also expand configuration file state. At step 512, the LCM software replicates state from the current VIM server appliance to the upgraded VIM server appliance. For example, LCM 235U in VIM server appliance 230 cooperates with LCM 235U in VIM server appliance 230U to replicate state of database 226 to database 226U. LCM 235U can also replicate state of configuration files 227. For example, LCM 235U can copy any configuration files 227 that have been expanded to VIM server appliance 230U. Replication is performed continuously over time until the switchover phase to ensure no data loss.

At step 514, the LCM software performs switchover from the source VIM server appliance to the target VIM server appliance. For example, LCM 235U in VIM server appliance 230 deactivates VI services 208 (other than itself) and LCM 235U in VIM server appliance 230U activates VI services 208U. In embodiments, switchover includes stopping VI services 208 (other than LCM 235U and database 226), replicating any last state changes (if any), stopping the network on VIM server appliance 230, shutting down VIM server appliance 230, starting the network on VIM server appliance 230U and applying the network identity, and then starting VI services 208U. The switchover phase has a downtime for which the user must plan. However, the switchover phase is the only phase that has downtime in the application upgrade method 500. During switchover, at step 516, LCM software performs HA switchover, as discussed in FIG. 7 below.

At step 518, the LCM software contracts state of the upgraded VIM server appliance. For example, LCM 235U in VIM server appliance 230U can contract state of database 226U to remove deprecated state. LCM 235U can also contract state of any configuration files 227U that were expanded to remove deprecated state. Since the deprecated state is unused, it can be removed while VI services 208U are active and executing.

Figure 7:
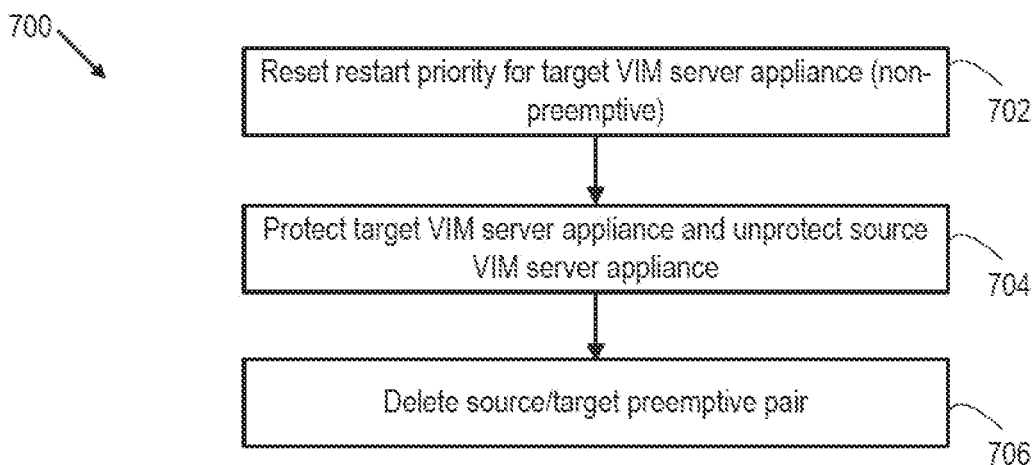
FIG. 7 is a flow diagram depicting a method of handling HA during switchover from source VIM server appliance to target VIM server appliance during reduced downtime upgrade according to an embodiment.

FIG. 7 is a flow diagram depicting a method 700 of handling HA during switchover from source VIM server appliance to target VIM server appliance during reduced downtime upgrade according to an embodiment. Method 700 can be performed in step 518 of method 500 discussed above. Method 700 begins at step 702, where the LCM software resets the restart priority for the target VIM server appliance by setting the target VIM server appliance to be non-preemptive. At step 704, the LCM software sets the target VIM server appliance to be protected and the source VIM server appliance to be unprotected. At step 706, the LCM software deletes the source/target preemptive pair. The LCM software cooperates with HA components, including the master FDM, to perform steps 702-706.

Figure 8:
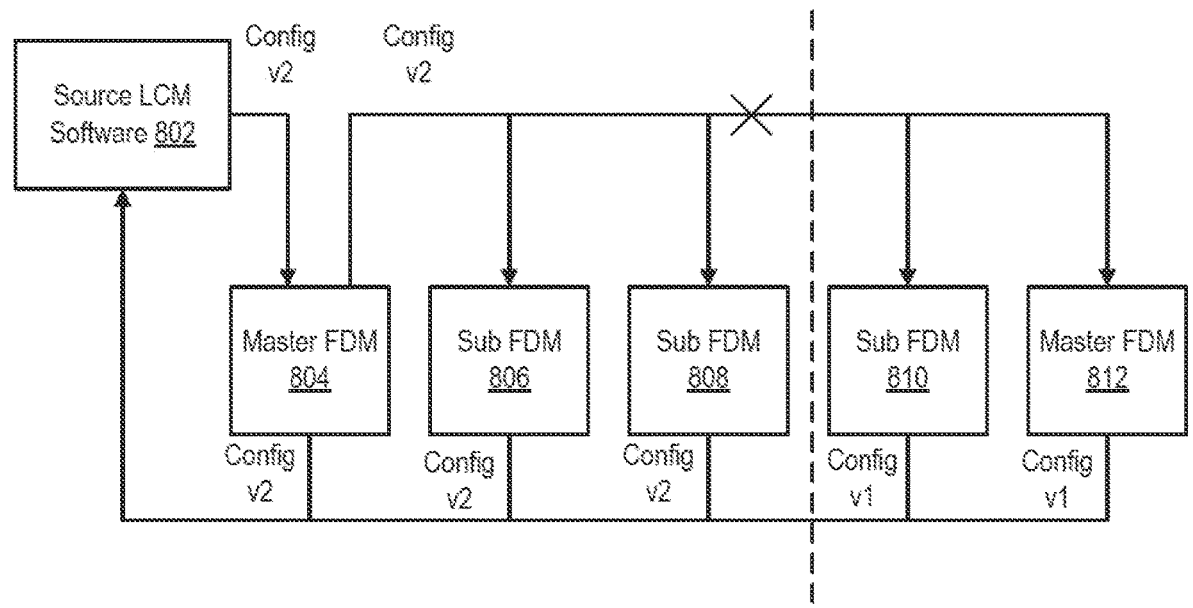
FIG. 8 is a block diagram depicting distribution and receipt of cluster configuration data in an HA-enabled host cluster according to embodiments.

FIG. 8 is a block diagram depicting distribution and receipt of cluster configuration data in an HA-enabled host cluster according to embodiments. In this example, source LCM software 802 (e.g., LCM 235U in VIM server appliance 230) is performing HA initialization as described above. Source LCM software 802 provides cluster configuration data to a master FDM 804 of the cluster (master FDM 804). In this example, the configuration information is designated config version 2 (v2). This configuration sets up the preemptive pair of the source VIM server appliance and the target VIM server appliance, as discussed above. Master FDM 804 then distributes the config version 2 to its subordinate FDMs (e.g., FDMs 806 and 808). Due to a network partition, master FDM 804 cannot communicate with FDMs 810 and 812. In the network partition, since the FDMs were disconnected from master FDM 804, a new election results in master FDM 812 with subordinate FDM 810. Since there is no communication with master FDM 804, both FDMs 810 and 812 remain at cluster configuration version 1 (v1). Source LCM software 802 attempts to verify cluster configuration from each of FDMs 804-812. Source LCM software 802 receives config v2 from each FDM 804, 806, and 808, and config v1 from FDMs 810 and 812 (if any can be obtained due to the network partition).

Figure 9:
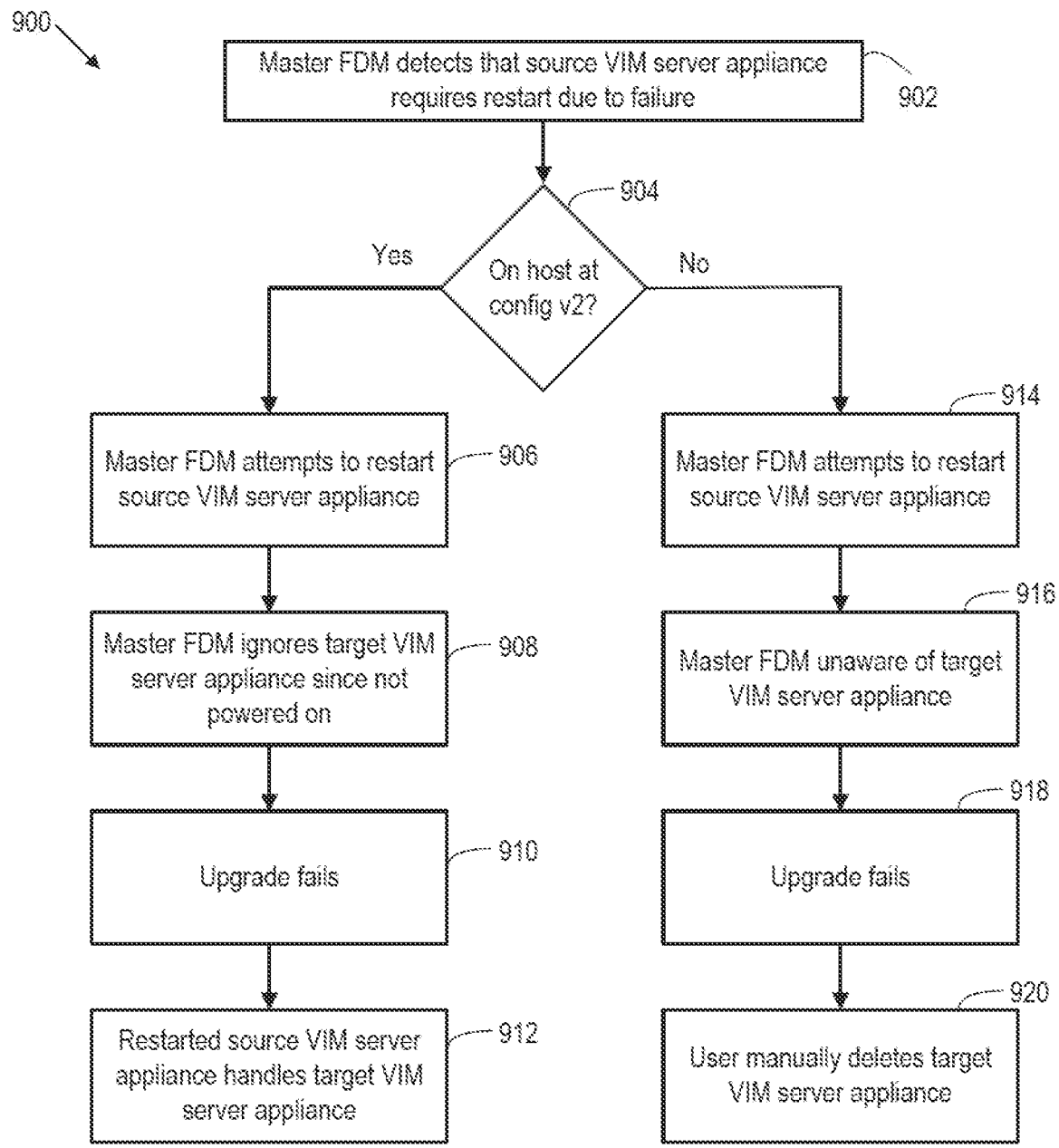
FIG. 9 is a flow diagram depicting a method of handling failure of a source VIM server appliance during reduced downtime upgrade according to embodiments.

FIG. 9 is a flow diagram depicting a method 900 of handling failure of a source VIM server appliance during reduced downtime upgrade according to embodiments. Method 900 begins at step 902, where the master FDM detects that the source VIM server appliance requires a restart due to failure. When the upgrade is in the staging phase, the source VIM server appliance is protected and thus the master FDM will try to restart the source VIM in case of any failure. At step 904, the master FDM proceeds with different procedures depending the version of the configuration data it has received at its host. If the host is at configuration version 2, method 900 proceeds to step 906. At step 906, the master FDM (e.g., FDM 804) attempts to restart the source VIM server appliance on another host. At step 908, the master FDM ignores the target VIM server appliance since it is not powered on. At step 910, the LCM software fails the upgrade process based on result received from the master FDM (i.e., the restarted source VIM appliance). At step 912, the restarted source VIM server appliance handles the target VIM server appliance (e.g., can delete and retry the upgrade process).

If the host is at configuration version 1 in step 904, the method 900 proceeds to step 914. At step 914, the master FDM attempts to restart the source VIM server appliance. At step 916, the master FDM is unaware of the target VIM server appliance since it only has access to configuration version 1 (prior to the upgrade process). At step 918, the LCM software fails the upgrade process based on result received from the master FDM (i.e., the restarted source VIM appliance). At step 920, the user manually deletes the target VIM server appliance.

Figure 10:
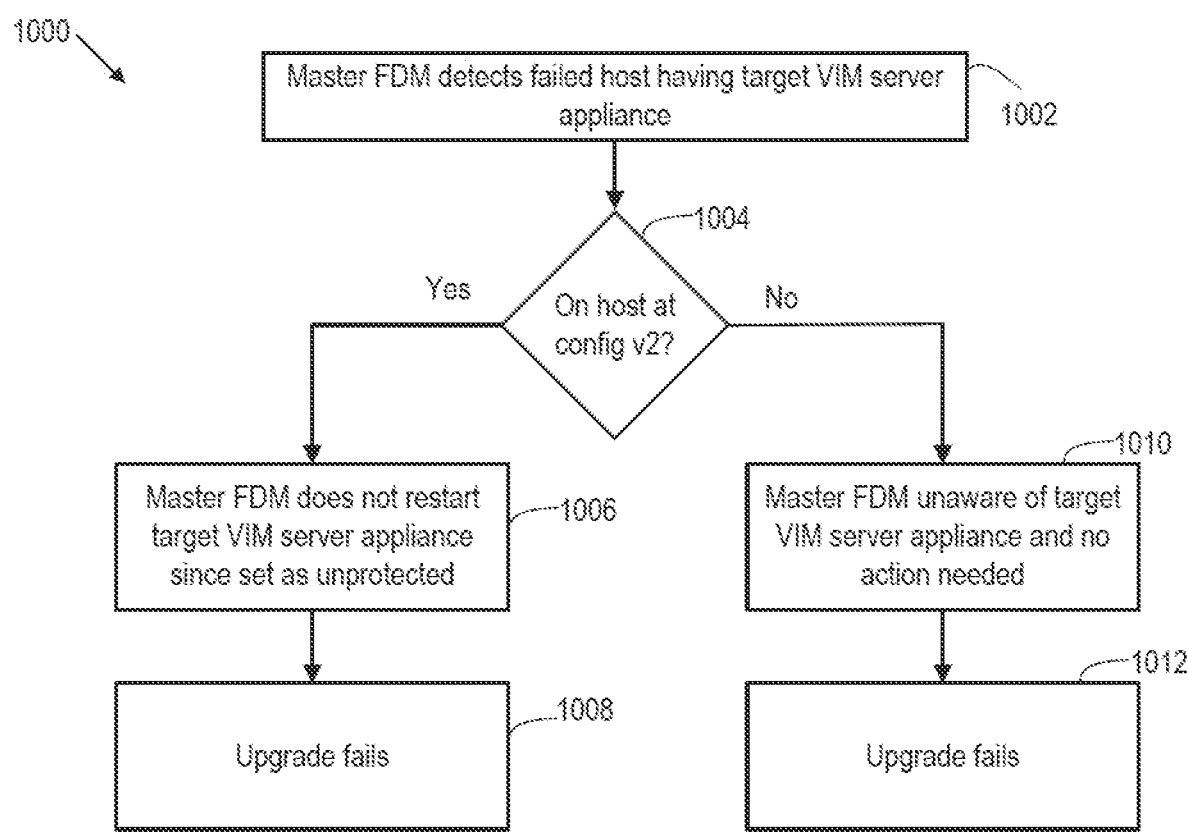
FIG. 10 is a flow diagram depicting a method of handling failure of a target VIM server appliance during reduced downtime upgrade according to embodiments.

FIG. 10 is a flow diagram depicting a method 1000 of handling failure of a target VIM server appliance during reduced downtime upgrade according to embodiments. Method 1000 begins at step 1002, where the master FDM detects that a host failure having the target VIM server appliance. When the upgrade is in the staging phase, the target VIM server appliance is unprotected. At step 1004, the master FDM proceeds with different procedures depending the version of the configuration data it has received at its host. If the host is at configuration version 2, method 1000 proceeds to step 1006. At step 1006, the master FDM (e.g., FDM 804) does not restart the target VIM server appliance since it is set as unprotected. At step 1008, the LCM software fails the upgrade process based on result received from the master FDM (i.e., the target's host has failed). If the host is at configuration version 1 in step 1004, the method 1000 proceeds to step 1010. At step 1010, the master FDM is unaware of the target VIM server appliance. At step 1012, the LCM software fails the upgrade process based on result received from the master FDM (i.e., the target's host has failed).

Figure 11:
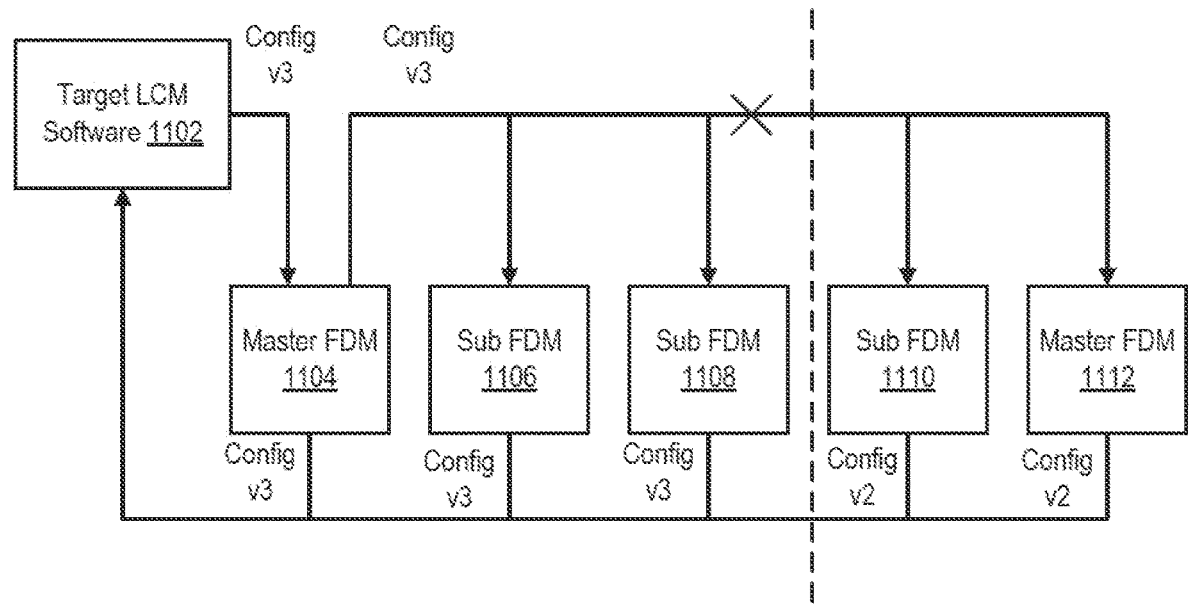
FIG. 11 is a block diagram depicting distribution and receipt of cluster configuration data in an HA-enabled host cluster according to embodiments.

FIG. 11 is a block diagram depicting distribution and receipt of cluster configuration data in an HA-enabled host cluster according to embodiments. In this example, target LCM software 1102 (e.g., LCM 235U in VIM server appliance 230U) is performing HA switchover as described above. Target LCM software 1102 provides cluster configuration data to a master FDM 1104 of the cluster (master FDM 1104). In this example, the configuration information is designated config version 3 (v3). This configuration removes the preemptive pair of the source VIM server appliance and the target VIM server appliance, as discussed above. Master FDM 1104 then distributes the config version 3 to its subordinate FDMs (e.g., FDMs 1106 and 1108). Due to a network partition, master FDM 804 cannot communicate with FDMs 1110 and 1112. In the network partition, since the FDMs were disconnected from master FDM 804, a new election results in master FDM 1112 with subordinate FDM 1110. Since there is no communication with master FDM 1104, both FDMs 1110 and 1112 remain at cluster configuration version 2 (v2). Target LCM software 1102 attempts to verify cluster configuration from each of FDMs 1104-1112. Source LCM software 1102 receives config v3 from each FDM 1104, 1106, and 1108, and config v2 from FDMs 1110 and 1112 (if any can be obtained due to the network partition).

Figure 12:
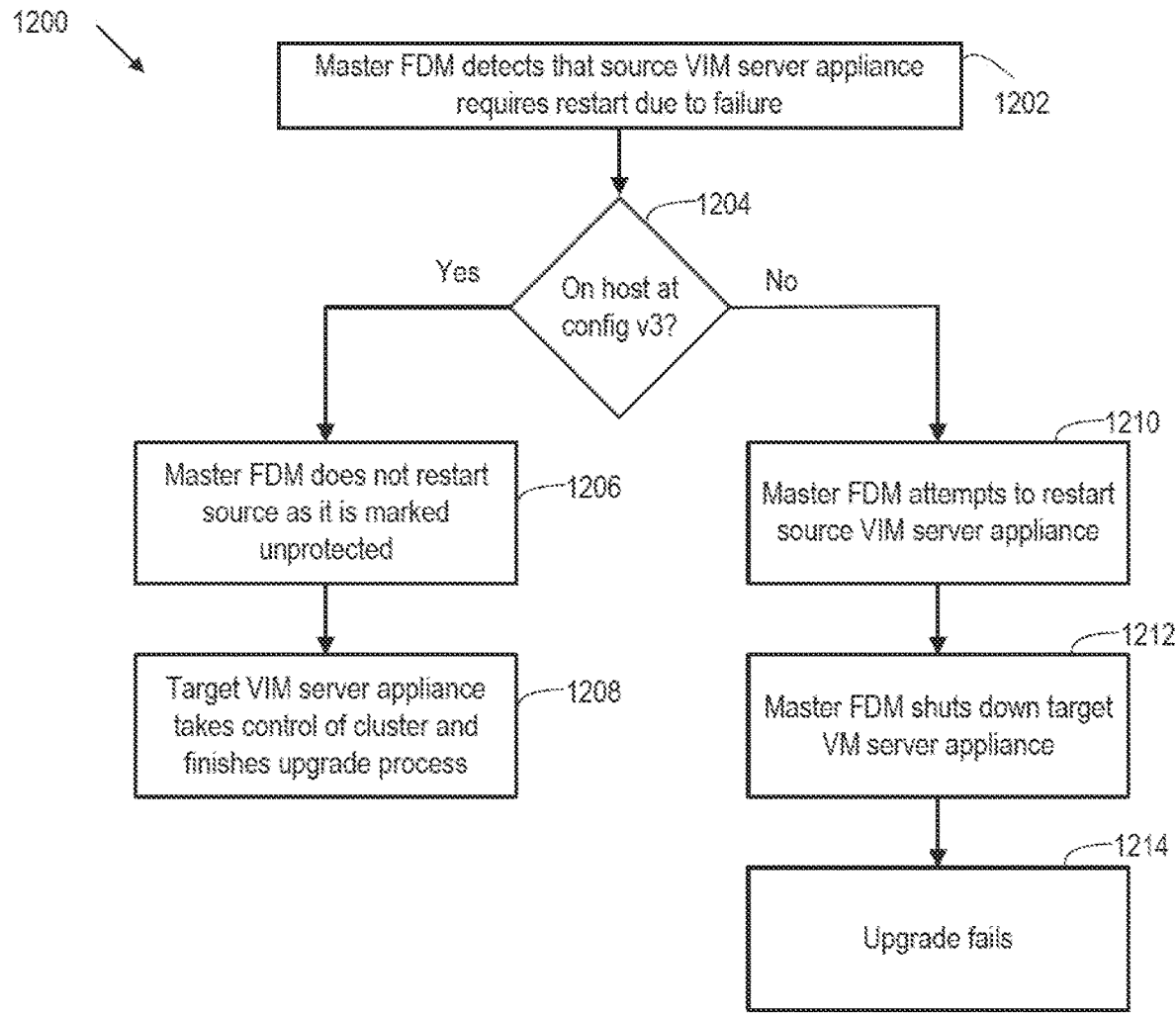
FIG. 12 is a flow diagram depicting a method of handling failure of a source VIM server appliance during reduced downtime upgrade according to embodiments.

FIG. 12 is a flow diagram depicting a method 1200 of handling failure of a source VIM server appliance during reduced downtime upgrade according to embodiments. In method 1200, the upgrade process is in the switchover phase. Method 1200 begins at step 1202, where the master FDM detects that the source VIM server appliance requires a restart due to failure. At step 1204, the master FDM proceeds with different procedures depending the version of the configuration data it has received at its host. If the host is at configuration version 3, method 1200 proceeds to step 1206. At step 1206, the master FDM (e.g., FDM 804) does not restart the source VIM server appliance on another host since, in version 3 during switchover, the source VIM server appliance is unprotected. At step 1208, the target VIM server appliance takes control of the cluster and finishes the upgrade process.

If the host is at configuration version 2 in step 1204, the method 1200 proceeds to step 1210. At step 1210, the master FDM attempts to restart the source VIM server appliance since, in version 2 of the configuration, the source is still the protected VM in the preemption pair. At step 1212, the master FDM shuts down the target VM server appliance since it is the preemptible VM in the pair. At step 1214, the LCM software fails the upgrade process based on result received from the master FDM (i.e., the restarted source VIM appliance).

Figure 13:
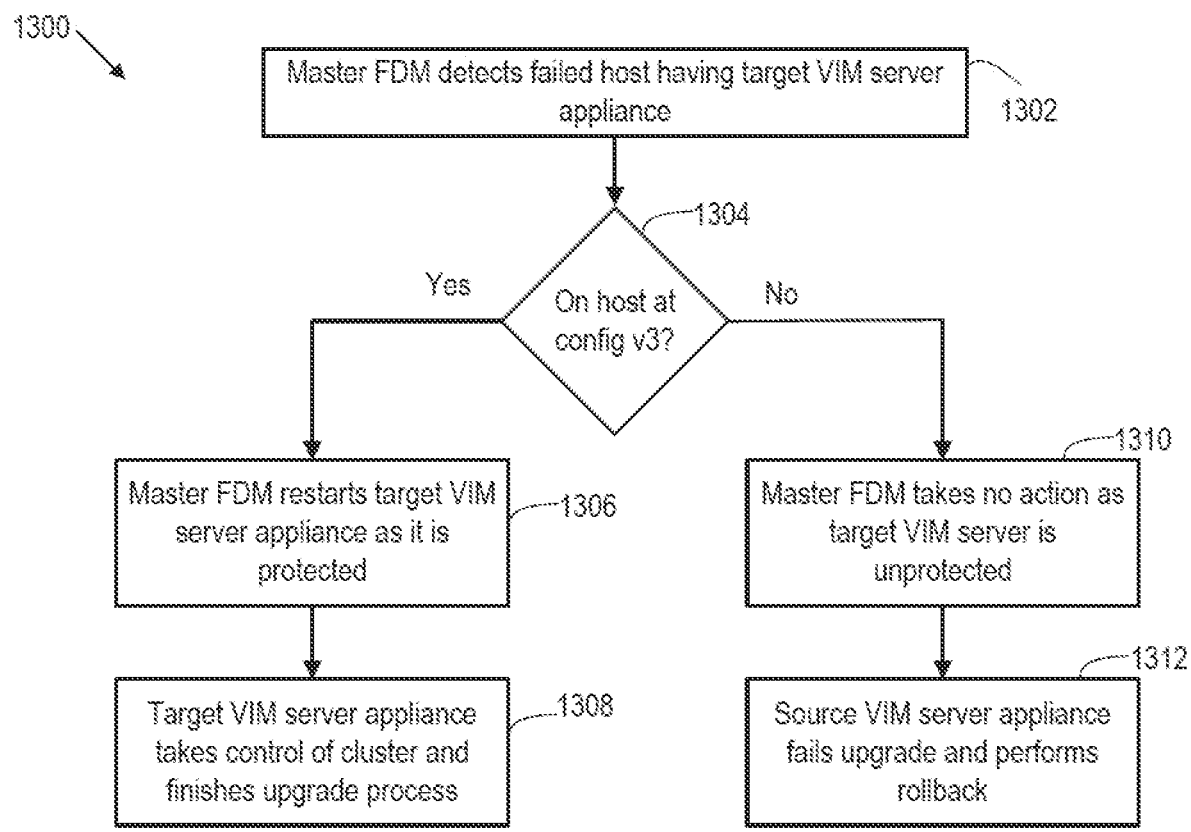
FIG. 13 is a flow diagram depicting a method of handling failure of a target VIM server appliance during reduced downtime upgrade according to embodiments.

FIG. 13 is a flow diagram depicting a method 1300 of handling failure of a target VIM server appliance during reduced downtime upgrade according to embodiments. In method 1300, the upgrade process is in the switchover phase. Method 1300 begins at step 1302, where the master FDM detects that a host failure having the target VIM server appliance. When the upgrade is in the switchover phase, the target VIM server appliance is protected and the source VIM server appliance is unprotected. At step 1304, the master FDM proceeds with different procedures depending the version of the configuration data it has received at its host. If the host is at configuration version 3, method 1300 proceeds to step 1306. At step 1306, the master FDM (e.g., FDM 804) restarts the target VIM server appliance since it is protected. At step 1308, the target VIM server appliance takes control of the cluster and finishes the upgrade process. If the host is at configuration version 3 in step 1304, the method 1300 proceeds to step 1310. At step 1310, the master FDM takes no action as the target VIM server appliance is unprotected. At step 1312, the source VIM server appliance fails the upgrade and performs rollback.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of upgrading an application in a software-defined data center (SDDC), comprising:
   deploying, by lifecycle management software executing in the SDDC, a first appliance and a second appliance, the first appliance executing services of the application at a first version, the second appliance having services of the application at a second version, the services in the first appliance being active and the services in the second appliance being inactive;
   controlling, by the lifecycle management software, the first appliance and the second appliance as a preemptive pair, where the first appliance is protected and the second appliance is unprotected by fault domain management (FDM) software executing in the SDDC;
   performing, by the lifecycle management software, a switchover to stop the services of the first appliance and start the services of the second appliance, the first appliance being set as unprotected and the second appliance being set as protected by the FDM software;
   expanding, by the lifecycle management software, state of the first appliance to support both the services at the first version and the services at the second version;
   replicating, by the lifecycle management software, the state of the first appliance to the second appliance; and
   contracting, by the lifecycle management software, state of the second appliance to remove a portion thereof that is unused by the services at the second version.

2. The method of claim 1, wherein the FDM software detects that the first appliance requires restart due to a failure prior to performing the switchover, and wherein the FDM software restarts the first appliance.

3. The method of claim 1, wherein the FDM software detects that the first appliance requires restart due to a failure during the switchover, and wherein the FDM software selectively restarts the first appliance based on configuration data of the FDM software.

4. The method of claim 1, wherein the FDM software detects that a host having the second appliance has failed prior to performing the switchover, and wherein the FDM software takes no action to restart the second appliance in response.

5. The method of claim 1, wherein the FDM software detects that a host having the second appliance has failed during the switchover, and wherein the FDM software restarts the second appliance in response.

6. The method of claim 1, wherein the first appliance and the second appliance are separated by a network partition, wherein the FDM software detects failure of either the first appliance or the second appliance, and wherein the FDM software selectively restarts either the first appliance or the second appliance depending on a version of configuration data of the first appliance compared with the second appliance.

7. A non-transitory computer readable medium comprising instructions to be executed in a computing device to cause the computing device to carry out a method of upgrading an application in a software-defined data center (SDDC), comprising:
   deploying, by lifecycle management software executing in the SDDC, a first appliance and a second appliance, the first appliance executing services of the application at a first version, the second appliance having services of the application at a second version, the services in the first appliance being active and the services in the second appliance being inactive;
   controlling, by the lifecycle management software, the first appliance and the second appliance as a preemptive pair, where the first appliance is protected and the second appliance is unprotected by fault domain management (FDM) software executing in the SDDC;
   performing, by the lifecycle management software, a switchover to stop the services of the first appliance and start the services of the second appliance, the first appliance being set as unprotected and the second appliance being set as protected by the FDM software;
   expanding, by the lifecycle management software, state of the first appliance to support both the services at the first version and the services at the second version;
   replicating, by the lifecycle management software, the state of the first appliance to the second appliance; and
   contracting, by the lifecycle management software, state of the second appliance to remove a portion thereof that is unused by the services at the second version.

8. The non-transitory computer readable medium of claim 7, wherein the FDM software detects that the first appliance requires restart due to a failure prior to performing the switchover, and wherein the FDM software restarts the first appliance.

9. The non-transitory computer readable medium of claim 7, wherein the FDM software detects that the first appliance requires restart due to a failure during the switchover, and wherein the FDM software selectively restarts the first appliance based on configuration data of the FDM software.

10. The non-transitory computer readable medium of claim 7, wherein the FDM software detects that a host having the second appliance has failed prior to performing the switchover, and wherein the FDM software takes no action to restart the second appliance in response.

11. The non-transitory computer readable medium of claim 7, wherein the FDM software detects that a host having the second appliance has failed during the switchover, and wherein the FDM software restarts the second appliance in response.

12. The non-transitory computer readable medium of claim 7, wherein the first appliance and the second appliance are separated by a network partition, wherein the FDM software detects failure of either the first appliance or the second appliance, and wherein the FDM software selectively restarts either the first appliance or the second appliance depending on a version of configuration data of the first appliance compared with the second appliance.

13. A virtualized computing system, comprising:
at least one host having a hardware platform; and
a software platform executing on the hardware platform, the software platform including lifecycle management software configured to upgrade an application executing in a software-defined data center (SDDC), the lifecycle management software configured to:
deploy a first appliance and a second appliance, the first appliance executing services of the application at a first version, the second appliance having services of the application at a second version, the services in the first appliance being active and the services in the second appliance being inactive;
control the first appliance and the second appliance as a preemptive pair, where the first appliance is protected and the second appliance is unprotected by fault domain management (FDM) software executing in the SDDC;
perform a switchover to stop the services of the first appliance and start the services of the second appliance, the first appliance being set as unprotected and the second appliance being set as protected by the FDM software;
expand state of the first appliance to support both the services at the first version and the services at the second version;
replicate the state of the first appliance to the second appliance; and
contract state of the second appliance to remove a portion thereof that is unused by the services at the second version.

14. The virtualized computing system of claim 13, wherein the FDM software is configured to detect that the first appliance requires restart due to a failure prior to performing the switchover, and wherein the FDM software is configured to restart the first appliance.

15. The virtualized computing system of claim 13, wherein the FDM software is configured to detect that the first appliance requires restart due to a failure during the switchover, and wherein the FDM software is configured to selectively restart the first appliance based on configuration data of the FDM software.

16. The virtualized computing system of claim 13, wherein the FDM software is configured to detect that a host having the second appliance has failed prior to performing the switchover, and wherein the FDM software is configured to take no action to restart the second appliance in response.

17. The virtualized computing system of claim 13, wherein the FDM software is configured to detect that a host having the second appliance has failed during the switchover, and wherein the FDM software is configured to restart the second appliance in response.

* * * * *